UNITED STATES PATENT OFFICE.

GUSTAVE BARRET AND ALEXANDRE D'ADHÉMAR, OF POINTE-A-PITRE, ISLAND OF GUADELOUPE.

IMPROVEMENT IN COMPOSITIONS FOR PAINT.

Specification forming part of Letters Patent No. 179,990, dated July 18, 1876; application filed April 24, 1876.

*To all whom it may concern:*

Be it known that we, GUSTAVE BARRET and ALEXANDRE D'ADHÉMAR, citizens of France, both residing at Pointe-a-Pitre, in the Island of Guadeloupe, have invented a new and useful Composition for the Protection of Iron, of which the following is a specification:

The base of our composition is natural sulpho-aluminate of iron, such as is found in the Island of Guadaloupe, where it goes by the name of "*crotte a cabri.*" This ingredient we mix with one-third of its weight of artificial sulphide of iron, such as may be prepared by treating heated iron-filings with sulphur. To the above composition, thoroughly pulverized and mingled, is added sufficient vulcanized and boiled linseed-oil or tar, or other suitable vulcanized and siccative vehicle, to form a semi liquid paint.

This paint should be applied to the desired object or surface while fresh, because the article quickly loses its fluidity in contact with the air.

We have found to be effective such a vulcanization of the vehicle as is produced by boiling therewith a two-hundredth part, by weight, of free sulphur. The coating thus prepared may be applied with a brush, the surface of the iron being thoroughly dry, and preferably, but not necessarily, hot.

The free sulphur in the composition attacks and combines with the superficial portion of the iron, which it, in fact, vulcanizes, and the effect is that the coating becomes incorporated with the substance of the metal, to which it firmly adheres as an integument.

Experiments lasting for five years demonstrate the fact that this coating remains intact, and resists effectively the scaling action of changes of temperature, and also effectively preserves the iron from the attacks of salt-water and other destructive agents. This coating is also found to be proof against incrustation by mollusks.

On the 21st of October, 1875, we filed an application for a patent for a compound of sulphides of iron with a siccative oil, which application was rejected.

We are well aware that it has long been proposed to use sulphide of iron mixed with oil as a paint for metals.

We claim as new and of our invention—

The composition consisting of the natural sulpho-aluminate of iron, *(crotte a cabri,)* an artificial sulphide of iron, and a vulcanized vehicle, substantially as set forth.

In testimony of which invention we hereunto set our hands.

GUSTAVE BARRET.
ALEXANDRE D'ADHÉMAR.

Attest:
CHAMBERTRAND,
F. DE LABROUSSE.